(12) United States Patent
Gressmann et al.

(10) Patent No.: US 12,462,681 B2
(45) Date of Patent: Nov. 4, 2025

(54) DETECTION OF MALFUNCTIONS OF THE SWITCHING STATE DETECTION OF LIGHT SIGNAL SYSTEMS

(71) Applicants: Robert Bosch GmbH, Stuttgart-Feuerbach (DE); Daimler AG, Stuttgart (DE)

(72) Inventors: Markus Gressmann, Boblingen (DE); Robert Lutz, Stuttgart (DE); Frank Lindner, Ulm (DE)

(73) Assignees: Robert Bosch GmbH, Stuttgart-Feuerbach (DE); Daimler AG, Stuttgart (DE)

(*) Notice: Subject to any disclaimer, the term of this patent is extended or adjusted under 35 U.S.C. 154(b) by 610 days.

(21) Appl. No.: 17/479,264

(22) Filed: Sep. 20, 2021

(65) Prior Publication Data
US 2022/0004786 A1    Jan. 6, 2022

Related U.S. Application Data

(63) Continuation of application No. PCT/EP2020/057305, filed on Mar. 17, 2020.

(30) Foreign Application Priority Data

Mar. 18, 2019 (DE) .................... 10 2019 106 844.4

(51) Int. Cl.
*G08G 1/0962* (2006.01)
*G06V 10/98* (2022.01)
(Continued)

(52) U.S. Cl.
CPC ......... *G08G 1/09623* (2013.01); *G06V 10/98* (2022.01); *G06V 20/584* (2022.01); *G08G 1/095* (2013.01)

(58) Field of Classification Search
CPC ...... G08G 1/09623; G08G 1/095; G08G 1/07; G06V 10/98; G06V 20/584; G07C 5/0808
See application file for complete search history.

(56) References Cited

U.S. PATENT DOCUMENTS 8,620,032 B2    12/2013 Zeng
10,627,814 B2    4/2020 Schweikl
(Continued)

FOREIGN PATENT DOCUMENTS

CN         109120916 A  *  1/2019  .......... H04N 17/002
DE     102006010295 A1      9/2007
(Continued)

OTHER PUBLICATIONS

H. Cho, Y. Seo, B. Kumar and R. Rajkumar, "A multi-sensor fusion system for moving object detection and tracking in urban driving environments," 2014 IEEE International Conference on Robotics and Automation (ICRA), Hong Kong, China, 2014, pp. 1836-1843, doi: 10.1109/ICRA.2014.6907100. (Year: 2014).*
(Continued)

*Primary Examiner* — Ming Y Hon
*Assistant Examiner* — Dominique James
(74) *Attorney, Agent, or Firm* — Barley Snyder

(57) ABSTRACT

A method for evaluating a functionality of a camera arrangement including a pair of cameras using a control unit includes determining a first switching state of a light signal system based on a first measurement data from a first camera of the pair of cameras, and determining a second switching state of the light signal system based on a second measurement data from a second camera of the pair of cameras. The method evaluates the functionality of the camera arrangement based on the first switching state and the second switching state.

12 Claims, 1 Drawing Sheet

(51) Int. Cl.
*G06V 20/58* (2022.01)
*G08G 1/095* (2006.01)

(56) References Cited

U.S. PATENT DOCUMENTS

| | | |
|---|---|---|
| 2014/0204209 A1 | 7/2014 | Huth et al. |
| 2015/0210275 A1 | 7/2015 | Huberman |
| 2015/0210312 A1 | 7/2015 | Stein et al. |
| 2015/0271421 A1* | 9/2015 | MacMillan .......... H04N 13/239 348/295 |
| 2017/0297489 A1* | 10/2017 | Fendt .................... H04N 7/181 |
| 2020/0101899 A1* | 4/2020 | Rathi .................... H04N 23/45 |
| 2020/0249684 A1* | 8/2020 | Onofrio ............... G05D 1/0219 |
| 2021/0261152 A1* | 8/2021 | Meijburg ............... G01C 21/28 |
| 2022/0317700 A1* | 10/2022 | Stein ...................... H04N 7/183 |

FOREIGN PATENT DOCUMENTS

| | | |
|---|---|---|
| DE | 102012207620 A1 | 12/2012 |
| DE | 102012025270 A1 | 8/2013 |
| DE | 102012108863 A1 | 5/2014 |
| DE | 102012023867 A1 | 6/2014 |
| DE | 102013102207 A1 | 9/2014 |
| DE | 102014014778 A1 | 4/2015 |
| DE | 102015224112 A1 | 6/2017 |
| WO | WO-2016035252 A1 * | 3/2016 ............... G06T 1/00 |

OTHER PUBLICATIONS

PCT International Search Report and Written Opinion, dated Jun. 17, 2020, 14 pages.
Abstract of DE102012108863, dated May 28, 2014, 1 page.
Abstract of DE102012025270, dated Aug. 1, 2013, 1 page.
Abstract of DE102006010295, dated Sep. 13, 2007, 1 page.
Abstract of DE102013102207, dated Sep. 11, 2014, 1 page.
Abstract of DE102014014778, dated Apr. 2, 2015, 1 page.
Chinese First Office Action dated Jul. 31, 2024 with English translation, corresponding to Application No. 202080022220.8, 21 pages.
Chinese Office Action dated Mar. 26, 2025 with English translation, corresponding to Application No. 202080022220.8, 29 pages.

* cited by examiner

DETECTION OF MALFUNCTIONS OF THE SWITCHING STATE DETECTION OF LIGHT SIGNAL SYSTEMS

CROSS-REFERENCE TO RELATED APPLICATIONS

This application is a continuation of PCT International Application No. PCT/EP2020/057305, filed on Mar. 17, 2020, which claims priority under 35 U.S.C. § 119 to German Patent Application No. 102019106844.4, filed on Mar. 18, 2019.

FIELD OF THE INVENTION

The present invention relates to a method for evaluating a functionality of a camera arrangement having at least two cameras for determining a switching state of a light signal system by a control device. Furthermore, the invention relates to a control device, a computer program and a machine-readable storage medium.

BACKGROUND

In the field of vehicles, driver assistance functionalities are known that may recognize the switching status of traffic lights and/or light signal systems. The respective activated signal transmitters and their color are detected by evaluating camera measurement data.

Reliable detection of the switching status of light signal systems is a safety-relevant function, especially in automated vehicles. Particularly high demands are therefore placed on the reliability of the components, such as the detecting camera and the evaluating control unit.

To increase the reliability of traffic light detection, sensors are usually used redundantly. However, this increases the cost of the camera arrangement. Furthermore, a more powerful control unit is required to evaluate two cameras simultaneously. This increases the costs, the required installation space and the power consumption of the camera arrangement.

SUMMARY

A method for evaluating a functionality of a camera arrangement including a pair of cameras using a control unit includes determining a first switching state of a light signal system based on a first measurement data from a first camera of the pair of cameras, and determining a second switching state of the light signal system based on a second measurement data from a second camera of the pair of cameras. The method evaluates the functionality of the camera arrangement based on the first switching state and the second switching state.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
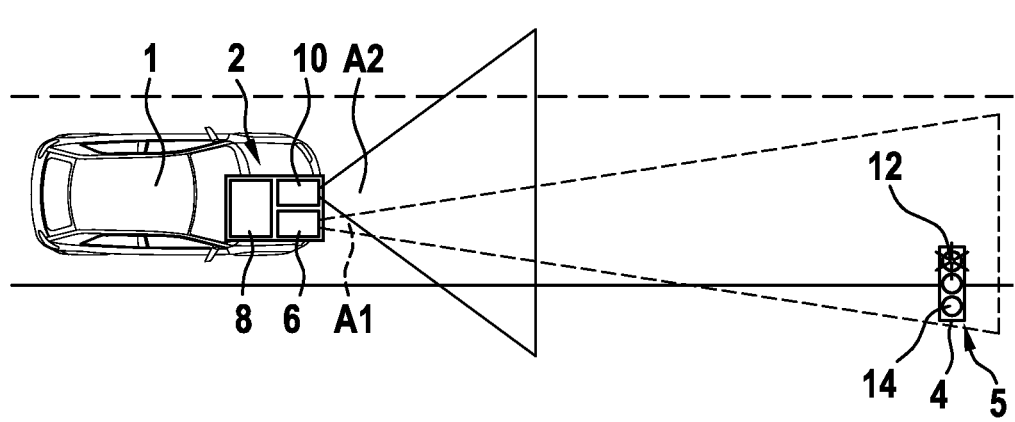
FIG. 1 is a schematic top view of a vehicle with a camera arrangement in which a light signal system is arranged in the scanning range of a long-range camera.

Embodiment examples of the invention are depicted in the schematic drawings and described in the following description. In the following, the same reference numerals may be used for the same features.

FIG. 1 shows a schematic top view of a vehicle 1 with a camera arrangement 2. The vehicle 1 may, in an embodiment, be operated in an assisted, partially automated, highly automated and/or fully automated or driverless mode in accordance with the BASt definition (BASt—German Federal Highway Research Institute). For this purpose, the vehicle 1 may have a vehicle control device that may access the environment sensors and the actuators for steering, accelerating and braking the vehicle. The camera arrangement 2 may be used to detect switching states of traffic lights or light signal systems.

A light signal system 4 is arranged in the scanning area A1 of a long-range camera 6 and may thus be detected by the long-range camera 6. In particular, the light signal system 4 may be detected by a control unit 8 of the vehicle 1 on the basis of an image evaluation of the long-range camera 6. The long-range camera 6 is embodied as the first camera 6 of the camera arrangement 2. The long-range camera 6 has a lens with a long focal length, as a result of which the scanning range A1 that may be used and/or evaluated by the control unit 8 has a relatively small scanning angle of e.g. 20° and a long range of e.g. 200 m.

The camera arrangement 2 has a second camera 10, as shown in the embodiment of FIG. 1. The second camera 10 is embodied as a short-range camera 10 and has a small focal length. Thus, the short-range camera 10 may have a scanning range A2 with a larger scanning angle compared to the first camera 6 of e.g. 50° or higher. The usable range of the second camera 10 may e.g. be up to 80 m.

In the embodiment shown in FIG. 1, the first camera 6 and the second camera 10 are arranged in parallel or side by side in a front area of the vehicle 1 and may scan an environment ahead of the vehicle 1. The first camera 6 and the at least one second camera 10 may also be used for functions other than traffic light detection, such as general environment detection. The control unit 8 is connected to the first camera 6 and the second camera 10 in a data-conducting manner and may thus receive, store and evaluate the measurement data. The measurement data from the second camera 10 may be referred to as a second measurement data. The at least two cameras 6, 10 may belong to different assistance systems of the vehicle 1 and may already be installed in the vehicle 1.

The usable range or the usable scanning angle of the cameras 6, 10 may e.g. be defined by a plane of focus and an optical system or the lens of the cameras 6, 10. The measurement data of objects in this scanning range A1, A2 may e.g. be scanned with high focus and with high contrast and thus analyzed with a high quality by the control unit 8.

The light signal system 4 may have one or more signal transmitters 12, 14 that indicate at least one switching state of the light signal system 4. The signal transmitters 12, 14 may be constantly activated or flashing-activated. The at least two cameras 6, 10 may be used to determine properties, such as color, position in the light signal system 4, absolute position, shape, light duration and the like of the activated signal transmitters 12, 14 and to assign a switching state of the light signal system 4.

According to the embodiment example shown in FIG. 1, a signal transmitter 12 of the light signal system 4 was detected by the first camera 6. The detected signal transmitter 12 is an activated or switched-on signal transmitter 12 that has a red color in the shown embodiment. The control unit 8 may thus assign a "red" switching state to the light signal system 4. The light signal system 4 has a yellow and a green signal transmitter 14, which are deactivated in the exemplary situation shown in FIG. 1. The signal transmitters 12, 14 of the light signal system 4 are arranged in a housing 5 of the light signal system 4. The signal transmitters 12, 14 of the light signal system 4, in an embodiment, are light emitting diode (LED) light sources.

By evaluating the measurement data of the first camera 6, a red color may be assigned to the signal transmitter 12 in the shown situation. Furthermore, the position of the signal transmitter 12 may be determined by the control unit 8 by evaluating the measurement data. Relative to the light signal system 4, the position corresponds to an upper or highest position.

Figure 2:
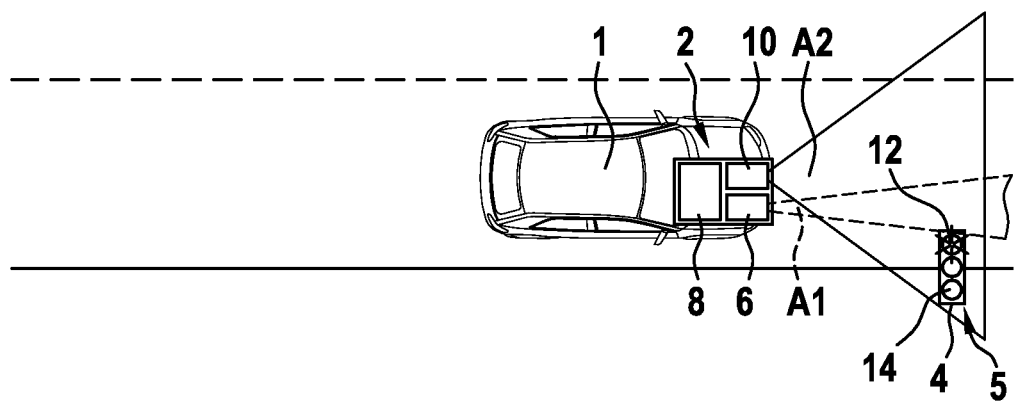
FIG. 2 is a schematic top view of the vehicle with the camera arrangement in which the light signal system is arranged in a scanning area of a short-range camera.

FIG. 2 shows a schematic top view of the vehicle 1 with the camera arrangement 2, in which the light signal system 4 is arranged in the scanning area A2 of the short-range camera 10. In this case, the long-range camera 6 may no longer perceive the light signal system 4, e.g. because the light signal system 4 is located at a distance of approximately 70 m from the vehicle 1 outside of the scanning range A1 of the long-range camera 6.

According to one aspect of the invention, a method is provided for evaluating a functionality of the camera arrangement 2 with the control unit 8. FIG. 1 and FIG. 2 in particular serve to illustrate the method according to an embodiment for detecting malfunctions of the camera arrangement 2 with the at least two cameras 6, 10 for determining a switching state of the light signal system 4 by the control unit 8. The control unit 8 carries out the method.

In one step, as shown for example in FIG. 1, a first switching state of the light signal system 4 is determined based on measurement data from the first camera 6.

In a further step, as shown for example in FIG. 2, a second switching state of the light signal system 4 is determined based on measurement data from at least one second camera 10. Alternatively, the first switching state may also be determined based on measurement data from the at least one second camera 10 and the second switching state may be determined based on measurement data from the first camera 6 of the camera arrangement 2.

Subsequently, the first switching state and the second switching state are used to evaluate a functionality of the camera arrangement 2. The switching states of the light signal system 4 determined on the basis of measurement data from the respective cameras 6, 10 may be compared to one another by the control unit 8. It is possible to check whether the results are logical and technically reasonable. If, for example, discrepancies are detected by the control unit 8, a malfunction of the camera arrangement 2 and/or the evaluation of the measurement data may be assumed.

According to an embodiment, the first switching state and/or the second switching state of the light signal system 4 are determined by determining a signaling device position within the traffic signal housing 5, a signaling device color, and/or a signaling device shape. Thus, the housing 5 of the light signal system 4 may be determined by an algorithm of the image evaluation. Within the housing 5 or the extension of the light signal system 4, respectively, the color of the signal transmitters 12, 14 and the position of the respective signal transmitters 12, 14 within the light signal system 4 may provide information about the switching state. For example, the uppermost signal transmitter 12 within the housing 5 may mean "red" or "stop" and the lowest signal transmitter 14 in the housing 5 may indicate "green" or "drive".

If, for example, at least one camera 6, 10 detects the lower signal transmitter 14 as active and then the uppermost signal transmitter 12 is detected as activated, the two signal transmitters 12, 14 may be compared to each other for plausibility. Due to the shared housing 5, the signal transmitters 12, 14 may be assigned to a light signal system 4.

In the case of public transport, such as streetcars, buses and the like, the shape of the activated signal transmitter 12, 14 may also define the switching state of the light signal system 4. For example, a bar-shaped, round or cross-shaped signal transmitter may be detected and assigned to a switching state. Furthermore, arrow-shaped signal transmitters may be detected by their shape and assigned to a switching state.

The first switching state and the second switching state may be the same or different. Since the second switching state is detected by the second camera 10 with a time delay, the light signal system 4 may have changed the switching state in the meantime, as a result of which different signal transmitters 12, 14 are actively switched. In this case, a result of the evaluation is logical or plausible if, for example, the evaluation of the measurement results of the cameras 6, 10 determine the same position and the same color at different times.

According to a further embodiment, the malfunction of the camera arrangement 2 is detected when the same positions and different colors of the at least one signal transmitter 12, 14 are determined based on the measurement data of the first camera 6 and the second camera 10. For example, the malfunction of at least one camera 6, 10 may be detected if the assignment or the detection of the color of the signal transmitters 12, 14 within a light signal system 4 or the housing 5 of the light signal system 4 differs between the cameras 6, 10.

Furthermore, a malfunction may be detected if both cameras 6, 10 detect the same light signal transmitters 12, 14 at the same time, but the detected color of the activated light signal transmitters 12, 14 is different. The cameras 6, 10 detect the same traffic light if the traffic light may be measured simultaneously in the field of view of both cameras 6, 10. In this case, the position of the light signal transmitter 12, 14 is not relevant for the detection of a malfunction.

According to a further embodiment, the malfunction of the camera arrangement 2 is detected if different positions and the same colors of the at least one signal transmitter 12, 14 are determined on the basis of the measurement data from the first camera 6 and the second camera 10. Here, analogously, a discrepancy may be determined during the determination of measurement data from one camera or a discrepancy may be determined during the evaluation of the measurement data.

In the cases mentioned, there is a high probability of a malfunction of the traffic light detection or the camera arrangement 2 used. To increase safety in road traffic, this function may be deactivated and the vehicle 1 may be switched to a safe state by the control unit 8 or to a manually controllable state.

According to a further embodiment, the position of the at least one signal transmitter 12, 14 is determined relative to the light signal system 4 or relative to the camera arrangement 2. Localizing or determining of the position of an activated signal transmitter 12, 14 may be carried out in a technically particularly simple manner if the position is set in relation to the position or shape of the light signal system 4.

Alternatively or additionally, an absolute positioning of the activated signal transmitters 12, 14 within the scanning area or relative to the camera arrangement 2 may be performed. In this way, the position of the signal transmitters 12, 14 within the housing 5 of the light signal system 4 may be determined and assessed even in darkness or adverse visibility conditions. In this case, the respective signal transmitters 12, 14 must be assigned to a common light signal system 4.

For example, the position may have precise coordinates or may be specified as a relative position, such as "top", "center", "bottom".

According to a further embodiment, the position of the at least one signal transmitter 12, 14 and the corresponding color of the respective signal transmitter 12, 14 of the light signal system 4 are received from a database by the control unit 8. This allows the respective possible positions of the signal transmitters 12, 14 to be taken from the database. Such a database may, for example, be embodied as a precise map for highly automated driving.

An exemplary embodiment of the method will now be described with respect to FIGS. 1 and 2. In the shown embodiment, the situation shown in FIG. 2 is a few seconds, for example 5 seconds, later than the situation shown in FIG. 1. This illustrates the movement of the vehicle 1 in the direction of the light signal system 4. Since the intrinsic movement of the vehicle 1 is known, the stationary light signal system 4 may be 'tracked' and thus unambiguously assigned in between the point in time in FIG. 1 and FIG. 2.

In this case, the measurement data of the second camera 10 is recorded at a later time than the measurement data of the first camera 6. This allows the light signal system 4 to be detected in advance by the long-range camera 6 and a switching state to be calculated by the control unit 8 on the basis of the measurement data. If the vehicle moves towards the light signal system, the light signal system 4 increasingly moves out of the scanning range of the long-range camera 6 and may be detected by the short-range camera 10, for example, from a distance of 70 m between the vehicle 1 and the light signal system 4

With such a camera arrangement 2, the light signal system 4 may be detected by the cameras 6, 10 one after the other. The computing effort for the evaluation of the measurement data by the control unit 8 may be reduced, since no redundant arrangement of the cameras 6, 10 is necessary for each measurement area. Furthermore, the use of a long-range camera 6 allows the switching status of the light signal system 4 to be detected at an early stage, which increases comfort and safety in road traffic.

According to a further embodiment, the camera arrangement 2 is moved relative to the light signal system 4, with the at least one signal transmitter 12, 14 of the light signal system 4 being tracked in its position relative to the camera arrangement 2 on the basis of the measurement data of the first camera 6. The measurement data from the first camera 6 may be referred to as a first measurement data.

The signal transmitter of the light signal system 4 detected in the scanning range of the first camera 6 may thus move in the determined measurement data that change over time. The measurement data may, in various embodiments, have the form of moving images or video data. In the case of a light signal system 4 arranged above the traffic, the detected signal transmitter 12, 14 may move in the direction of an upper area of the images.

A traffic signal located at the lateral edge of the roadway and detected by the first camera 6 will move toward a lateral boundary of the scanning area in the measurement data as the camera arrangement 2 approaches. The movement of the light signal system 4 in the measurement data continues until the signal transmitter 12, 14 is outside the scanning range and may therefore no longer be detected by the first camera 6.

This movement of the light signal system 4 and in particular of the at least one detected signal transmitter 12, 14 through the scanning area may be tracked or traced by the control unit 8. The arrangement of the at least two cameras 6, 10 of the camera arrangement 2 relative to each other is known in advance, which increases the precision of the plausibility check and the reliability of the traffic signal detection.

The light signal system 4 is also in the "red" switching state in FIG. 2 in the shown embodiment. Thus, by evaluating the measurement data of the short-range camera 10, only the activated signal transmitter 12 may be determined and assigned the red color and the uppermost position within the light signal system 4.

The control unit 8 may determine from the position and color of the signal transmitter 12 detected from the measurement data of the first camera 6 and from the measurement data of the second camera 10 that the color and position correspond at different points in time. Thus, the result of the traffic light detection, the switching state "red", is plausible and a malfunction may be excluded.

If a changeover from a red color to a green color occurs in the scanning area A2 of the second camera 10, the lowest signal transmitter 14 is activated and detected by the second camera 10. This enables the control unit 8 to determine both a different position and a different color of the signal transmitters 12, 14 from the measurement data of the cameras 6, 10. Consequently, it may also be assumed that the camera arrangement 2 is functioning correctly.

In case of the color being the same and the detected position of the signal transmitters 12, 14 of the light signal system 4 different, on the other hand, the control unit 8 may detect a discrepancy in the detection of the switching state of the light signal system 4. In this case, there is a malfunction, so that this function of the vehicle 1 is e.g. deactivated.

According to a further embodiment, at least one signal and/or at least one control command are generated and sent by the control unit 8 based on a plausibility check of the functionality of the camera arrangement 2. The at least one signal and/or the at least one control command may be generated when the camera arrangement 2 has been positively evaluated and is thus operating without error, or when a malfunction of the camera arrangement 2 is detected by the control unit 8. In particular, the at least one signal may e.g. be transmitted to a teleoperator or an external server unit. The signal may have the form of an error message or a warning.

The at least one control command may be used to operate or influence a vehicle control system of the vehicle 1. For this purpose, e.g. steering commands, braking commands, acceleration commands and the like may be generated by the control unit 8 and transmitted to the vehicle control system. For example, the vehicle 1 may be placed in a safe state in the event of a detected malfunction of the camera arrangement 2. Alternatively or additionally, an automated driving mode may be deactivated due to the malfunction of the camera arrangement 2, so that the vehicle 1 may still be operated manually.

Furthermore, according to an aspect of the invention, a computer program is provided. The computer program comprises instructions that, when the computer program is executed by a control unit 8, cause the control unit 8 to execute the method. According to another aspect of the invention, a non-transitory machine-readable storage medium is provided on which the computer program is stored.

The method and the control unit 8 according to the invention increase a reliability of the camera arrangement 2. The method eliminates the redundant use of identical or very similar cameras with the same or a very similar installation position and characteristics (field of view and resolution), thus reducing costs, resource and installation space requirements for traffic light detection. The plausibility check allows the procedure to be robust against all kinds of random errors and malfunctions.

What is claimed is:

1. A method for evaluating a functionality of a camera arrangement including a pair of cameras using a control unit, comprising:
    determining a first switching state of a light signal system based on a first measurement data from a first camera of the pair of cameras;
    determining a second switching state of the light signal system based on a second measurement data from a second camera of the pair of cameras, the second measurement data from the second camera is recorded at a later point in time than the first measurement data from the first camera, the first switching state and/or the second switching state are determined by determining a position of a signal transmitter within a housing of the light signal system, a color of the signal transmitter, and/or a shape of the signal transmitter; and
    evaluating the functionality of the camera arrangement based on the first switching state and the second switching state, a malfunction of the camera arrangement is determined in the evaluating step if identical positions and different colors of the signal transmitter are determined on the basis of the first measurement data and the second measurement data.

2. The method of claim 1, wherein the malfunction of the camera arrangement is determined in the evaluating step if different positions and identical colors of the signal transmitter are determined on the basis of the first measurement data and the second measurement data.

3. The method of claim 1, wherein the position of the signal transmitter relative to the light signal system or relative to the camera arrangement is determined.

4. The method of claim 1, wherein the position of the signal transmitter and the color of the signal transmitter are received by the control unit from a database.

5. The method of claim 1, wherein the first camera is a long-range camera.

6. The method of claim 5, wherein the second camera is a short-range camera.

7. The method of claim 1, wherein the camera arrangement is moved relative to the light signal system.

8. The method of claim 7, wherein the signal transmitter of the light signal system has a position relative to the camera arrangement that is tracked on the basis of the first measurement data.

9. The method of claim 1, wherein, based on the evaluating step, a signal and/or a control command is generated and sent by the control unit.

10. A control unit for evaluating a measurement data from a pair of cameras of a camera arrangement, the control unit is configured to execute the method of claim 1.

11. A vehicle, comprising:
    a camera arrangement including a pair of cameras; and
    a control unit according to claim 10 connected to the pair of cameras.

12. A non-transitory machine-readable storage medium storing a computer program comprising commands which, when executing the computer program by a control unit, cause the control unit to execute the method of claim 1.

* * * * *